United States Patent
Cheng et al.

(10) Patent No.: US 11,131,084 B2
(45) Date of Patent: Sep. 28, 2021

(54) METHOD AND APPARATUS FOR SELECTING TARGET EXCAVATING POINT

(71) Applicant: Beijing Baidu Netcom Science And Technology Co., LTD., Beijing (CN)

(72) Inventors: Xinjing Cheng, Beijing (CN); Ruigang Yang, Beijing (CN); Yajue Yang, Beijing (CN); Feixiang Lu, Beijing (CN); Hao Xu, Beijing (CN)

(73) Assignee: Beijing Baidu Netcom Science and Technology Co., Ltd.

(*) Notice: Subject to any disclaimer, the term of this patent is extended or adjusted under 35 U.S.C. 154(b) by 146 days.

(21) Appl. No.: 16/677,337

(22) Filed: Nov. 7, 2019

(65) Prior Publication Data

US 2020/0240118 A1    Jul. 30, 2020

(30) Foreign Application Priority Data

Jan. 25, 2019  (CN) .......................... 201910075778.1

(51) Int. Cl.
*E02F 9/26* (2006.01)
*G06T 7/593* (2017.01)
*E02F 9/20* (2006.01)

(52) U.S. Cl.
CPC ............ *E02F 9/262* (2013.01); *E02F 9/2041* (2013.01); *G06T 7/593* (2017.01)

(58) Field of Classification Search
CPC ....... E02F 9/262; E02F 9/2041; E02F 9/2054; E02F 9/205; G06T 7/593
See application file for complete search history.

(56) References Cited

U.S. PATENT DOCUMENTS

| 6,108,949 A | 8/2000 | Singh et al. |
| 2020/0240117 A1* | 7/2020 | Cheng ................... G06T 3/0031 |

FOREIGN PATENT DOCUMENTS

| JP | H1088625 A | 4/1998 |
| JP | H11247230 A | 9/1999 |
| WO | WO2017115810 A1 | 7/2017 |
| WO | WO2018174154 A1 | 9/2018 |

* cited by examiner

*Primary Examiner* — Russell Frejd
(74) *Attorney, Agent, or Firm* — Weaver Austin Villeneuve & Sampson LLP (57) ABSTRACT

Embodiments of the present disclosure relate to a method and apparatus for selecting a target excavating point. The method includes: acquiring a height map of a material pile; discretizing the height map to obtain an excavating point set; acquiring an excavating trajectory set of an excavating point in the excavating point set; and selecting a target excavating point based on the excavating trajectory set of the excavating point in the excavating point set.

13 Claims, 4 Drawing Sheets

METHOD AND APPARATUS FOR SELECTING TARGET EXCAVATING POINT

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of excavating technology, and specifically to a method and apparatus for selecting a target excavating point.

BACKGROUND

The excavator, also known as a soil excavator, is generally an earthmoving machine that excavates materials above or below a carrying surface thereof by using a bucket, and loads the materials into a transport vehicle or unloads the materials to a stockyard. With the rapid development of engineering machinery and the demand of the actual operating environment, excavators are gradually developing towards autonomous operations.

In order to realize autonomous excavation of the excavator, a target excavating point needs to be determined before each excavation of materials to control the excavator to excavate the materials at the target excavating point. At present, a material pile is generally divided into a plurality of excavating points, and then the materials at each excavating point are sequentially excavated in a preset order (e.g., from top to bottom and from left to right).

SUMMARY

Embodiments of the present disclosure provide a method and apparatus for selecting a target excavating point.

In a first aspect, an embodiment of the present disclosure provides a method for selecting a target excavating point, including: acquiring a height map of a material pile; discretizing the height map to obtain an excavating point set; acquiring an excavating trajectory set of an excavating point in the excavating point set; and selecting a target excavating point based on the excavating trajectory set of the excavating point in the excavating point set.

In some embodiments, the selecting a target excavating point based on the excavating trajectory set of the excavating point in the excavating point set includes: selecting a candidate excavating point set based on the excavating trajectory set of the excavating point in the excavating point set; acquiring a material volume of a candidate excavating point in the candidate excavating point set; and selecting a target excavating point based on the material volume of the candidate excavating point in the candidate excavating point set.

In some embodiments, the selecting a candidate excavating point set based on the excavating trajectory set of the excavating point in the excavating point set includes: for an excavating point in the excavating point set, determining whether the excavating trajectory set of the excavating point includes an excavating trajectory on which a bucket of an excavator does not collide with an obstacle during movement and an excavating resistance is not greater than an excavating power of the excavator; and in response to determining that the excavating trajectory set of the excavating point comprises the excavating trajectory on which the bucket of the excavator does not collide with the obstacle during movement and the excavating resistance is not greater than the excavating power of the excavator, adding the excavating point as a candidate excavating point to the candidate excavating point set, and adding the determined excavating trajectory as a candidate excavating trajectory to a candidate excavating trajectory set of the candidate excavating point.

In some embodiments, the acquiring a material volume of a candidate excavating point in the candidate excavating point set includes: for a candidate excavating point in the candidate excavating point set, calculating a material volume of the candidate excavating point based on parameters of a candidate excavating trajectory in the candidate excavating trajectory set of the candidate excavating point, where the parameters of the candidate excavating trajectory include an insertion depth, a dragging length, a rotation radius, and a lifting height.

In some embodiments, the calculating a material volume of the candidate excavating point based on parameters of a candidate excavating trajectory in the candidate excavating trajectory set of the candidate excavating point includes: for a candidate excavating trajectory in the candidate excavating trajectory set of the candidate excavating point, calculating a material volume corresponding to the candidate excavating trajectory based on a width of the bucket of the excavator, and the insertion depth and dragging length of the parameters of the candidate excavating trajectory; and determining a material volume of the candidate excavating point based on the material volume corresponding to the candidate excavating trajectory in the candidate excavating trajectory set of the candidate excavating point.

In some embodiments, the discretizing the height map is implemented by contour line discretization.

In a second aspect, an embodiment of the present disclosure provides an apparatus for selecting a target excavating point, including: a first acquisition unit, configured to acquire a height map of a material pile; a discretization unit, configured to discretize the height map to obtain an excavating point set; a second acquisition unit, configured to acquire an excavating trajectory set of an excavating point in the excavating point set; and a selection unit, configured to select a target excavating point based on the excavating trajectory set of the excavating point in the excavating point set.

In some embodiments, the selection unit includes: a first selection subunit, configured to select a candidate excavating point set based on the excavating trajectory set of the excavating point in the excavating point set; an acquisition subunit, configured to acquire a material volume of a candidate excavating point in the candidate excavating point set; and a second selection subunit, configured to select a target excavating point based on the material volume of the candidate excavating point in the candidate excavating point set.

In some embodiments, the first selection subunit includes: a determination module, configured to determine, for an excavating point in the excavating point set, whether the excavating trajectory set of the excavating point includes an excavating trajectory on which a bucket of an excavator does not collide with an obstacle during movement and an excavating resistance is not greater than an excavating power of the excavator; and an adding module, configured to add, in response to determining that the excavating trajectory set of the excavating point comprises the excavating trajectory on which the bucket of the excavator does not collide with the obstacle during movement and the excavating resistance is not greater than the excavating power of the excavator, the excavating point as a candidate excavating point to the candidate excavating point set, and add the determined excavating trajectory as a candidate excavating trajectory to a candidate excavating trajectory set of the candidate excavating point.

In some embodiments, the acquisition subunit includes: a calculation module, configured to calculate, for a candidate excavating point in the candidate excavating point set, a material volume of the candidate excavating point based on parameters of a candidate excavating trajectory in the candidate excavating trajectory set of the candidate excavating point, where the parameters of the candidate excavating trajectory include an insertion depth, a dragging length, a rotation radius, and a lifting height.

In some embodiments, the calculation module includes: a calculation submodule, configured to calculate, for a candidate excavating trajectory in the candidate excavating trajectory set of the candidate excavating point, a material volume corresponding to the candidate excavating trajectory based on a width of the bucket of the excavator, and the insertion depth and dragging length of the parameters of the candidate excavating trajectory; and a determination submodule, configured to determine a material volume of the candidate excavating point based on the material volume corresponding to the candidate excavating trajectory in the candidate excavating trajectory set of the candidate excavating point.

In some embodiments, the discretizing the height map is implemented by contour line discretization.

In a third aspect, an embodiment of the present disclosure provides an electronic device, including: one or more processors; and a storage apparatus storing one or more programs; where the one or more programs, when executed by the one or more processors, cause the one or more processors to implement the method described in any implementation of the first aspect.

In a fourth aspect, an embodiment of the present disclosure provides a computer readable medium storing a computer program, where when the computer program is executed by a processor, the method as described in any implementation of the first aspect is implemented.

In the method and apparatus for selecting a target excavating point according to some embodiments of the present disclosure, the acquired height map is first discretized to obtain an excavating point set; and then a target excavating point is selected based on an excavating trajectory set of an excavating point in the excavating point set. By selecting the target excavating point based on excavating trajectories, the rationality of the target excavating point is ensured, and the excavating efficiency is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
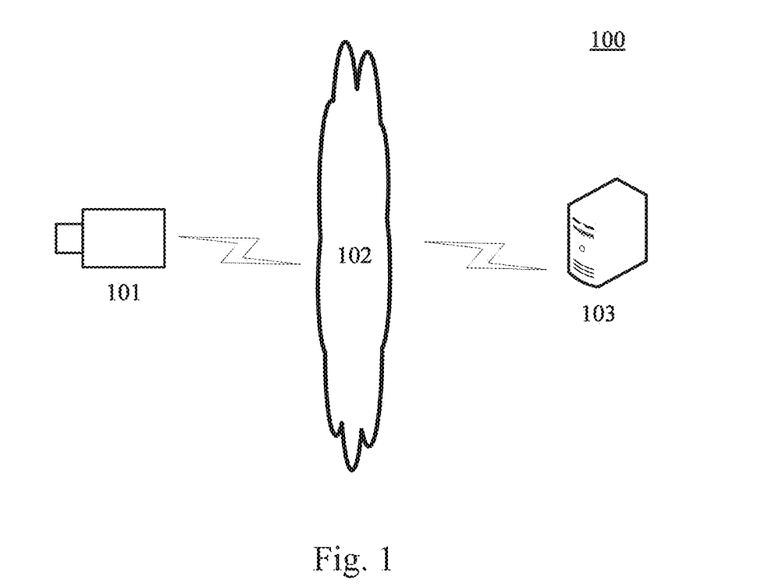
FIG. 1 is a diagram of an example system architecture in which an embodiment of the present disclosure may be implemented.

FIG. 1 shows an example system architecture 100 in which the method for selecting a target excavating point or the apparatus for selecting a target excavating point according to embodiments of the present disclosure may be implemented.

As shown in FIG. 1, the system architecture 100 may include a camera 101, a network 102, and a server 103. The network 102 serves as a medium providing a communication link between the camera 101 and the server 103. The network 102 may include various types of connections, such as wired or wireless communication links, or optical fiber cables.

The camera 101 may be mounted on an autonomous excavator, and can capture an image of a material pile to be excavated by the autonomous excavator. Generally, the camera 101 may be a binocular camera mounted on a side of a body of the autonomous excavator. The binocular camera captures a binocular image of the material pile when the body rotates to unload materials in a bucket.

The server 103 may be a server providing various services, e.g., a backend server of the autonomous excavator. The backend server of the autonomous excavator can analyze and process data such as the image of the material pile acquired by the camera 101, and generate a processing result (for example, a target excavating point).

It should be noted that the server 103 may be hardware or software. When being hardware, the server 103 may be implemented as a distributed server cluster composed of multiple servers, or implemented as a single server. When being software, the server 103 may be implemented as a plurality of software programs or software modules (e.g., for providing distributed services), or as a single software program or software module. Specific limitations are not provided here.

It should be noted that the method for selecting a target excavating point according to some embodiments of the present disclosure is generally executed by the server 103.

Accordingly, the apparatus for selecting a target excavating point is generally set in the server 103.

It should be appreciated that the numbers of the camera, the network, and the server in FIG. 1 are only schematic. Any number of cameras, networks, and servers may be provided based on implementation requirements.

Figure 2:
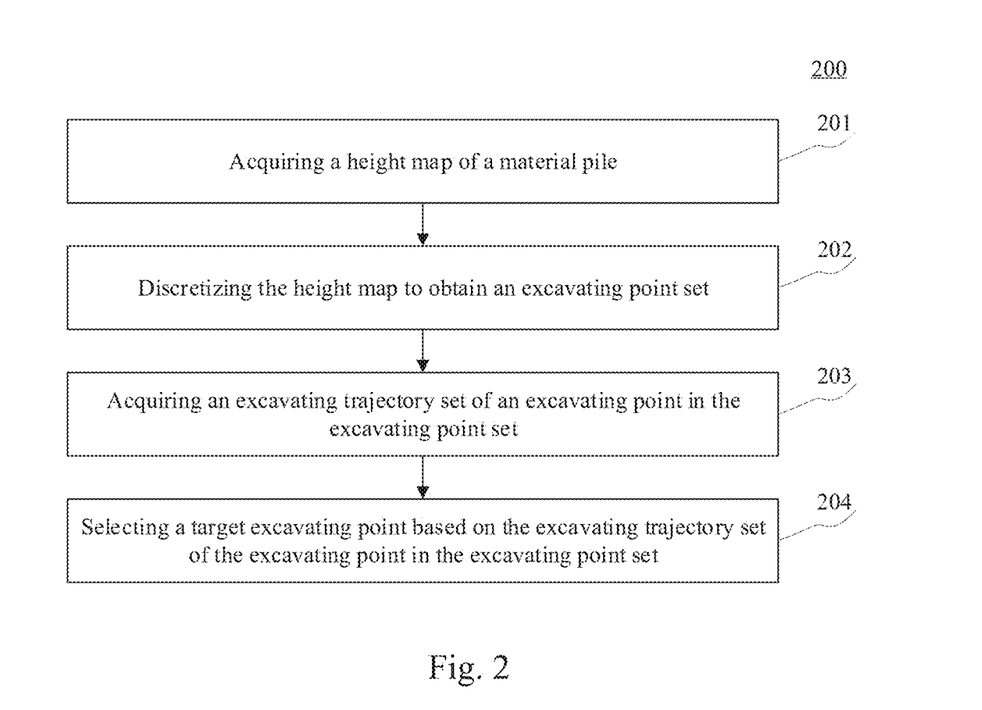
FIG. 2 is a flowchart of a method for selecting a target excavating point according to an embodiment of the present disclosure.

Further referring to FIG. 2, a flow 200 of a method for selecting a target excavating point according to an embodiment of the present disclosure is shown. The method for selecting a target excavating point includes the following steps.

Step 201: acquiring a height map of a material pile.

In the present embodiment, an executing body (for example, the server 103 shown in FIG. 1) of the method for selecting a target excavating point may acquire the height map of the material pile. The material pile may be formed by piling materials together. The materials mainly include soil, coal, silt, pre-loosened soil, rock, etc. The height map is generally a gray-scale image. Each pixel represents the height of a sample point. Generally, 0 (black) indicates the lowest point, and 255 (white) indicates the highest point.

Generally, a camera (for example, the camera 101 shown in FIG. 1) may be mounted on an autonomous excavator for acquiring an image of the material pile. In order to prevent an excavating arm of the autonomous excavator from obscuring the camera to shoot the material pile, the camera may be mounted on a side of a body of the autonomous excavator. When the body rotates to unload materials in a bucket, the camera mounted on the side of the body faces the material pile. At this time, the camera may be started to shoot the material pile. In order to generate a height map of the material pile, the camera mounted on the side of the body may be a binocular camera. In this way, when the body rotates to unload the materials in the bucket, the binocular camera may capture a binocular image of the material pile. The executing body may acquire the binocular image of the material pile from the binocular camera. Because binocular images are shot by the binocular camera by simulating the working mechanism of animal's eyes, each group of binocular images has certain horizontal parallax. The executing body may determine the distance between the material pile and the binocular camera based on the horizontal parallax to obtain a depth map of the material pile. Subsequently, the executing body may perform three-dimensional reconstruction on the depth map of the material pile by using a three-dimensional reconstruction algorithm (for example, a Kinect Fusion algorithm), thus obtaining a three-dimensional model of the material pile. Because the three-dimensional model contains information such as height, width and depth, the executing body easily generates a height map containing height information after obtaining the three-dimensional model of the material pile.

Step 202: discretizing the height map to obtain an excavating point set.

Figure 3A:
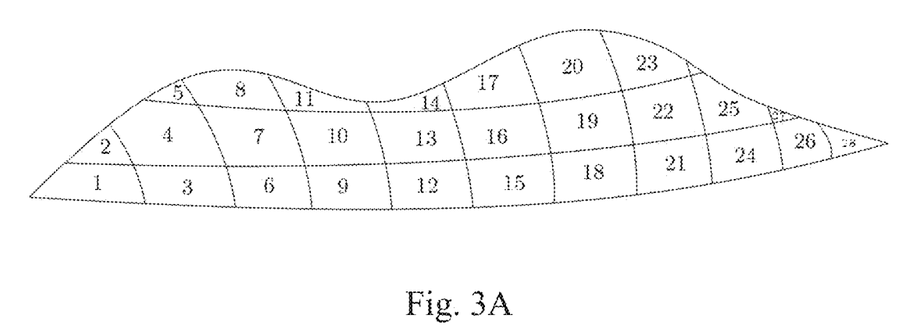
FIG. 3A is a schematic diagram of a height map after discretization.

In the present embodiment, the executing body may discretize the height map of the material pile to obtain an excavating point set. Generally, the executing body may perform grid discretization on the height map to obtain a plurality of grids. One grid corresponds to one excavating point. Optionally, the method of discretizing the height map may be contour line discretization. FIG. 3A shows a schematic diagram of a height map after discretization. In FIG. 3A, the height map of the material pile is discretized into 28 grids by using a contour line discretization method, and the 28 grids are sequentially numbered from bottom to top and from left to right.

Step 203: acquiring an excavating trajectory set of an excavating point in the excavating point set.

In the present embodiment, for each excavating point in the excavating point set, the executing body may first acquire the excavating trajectory set of the excavating point.

Figure 3B:
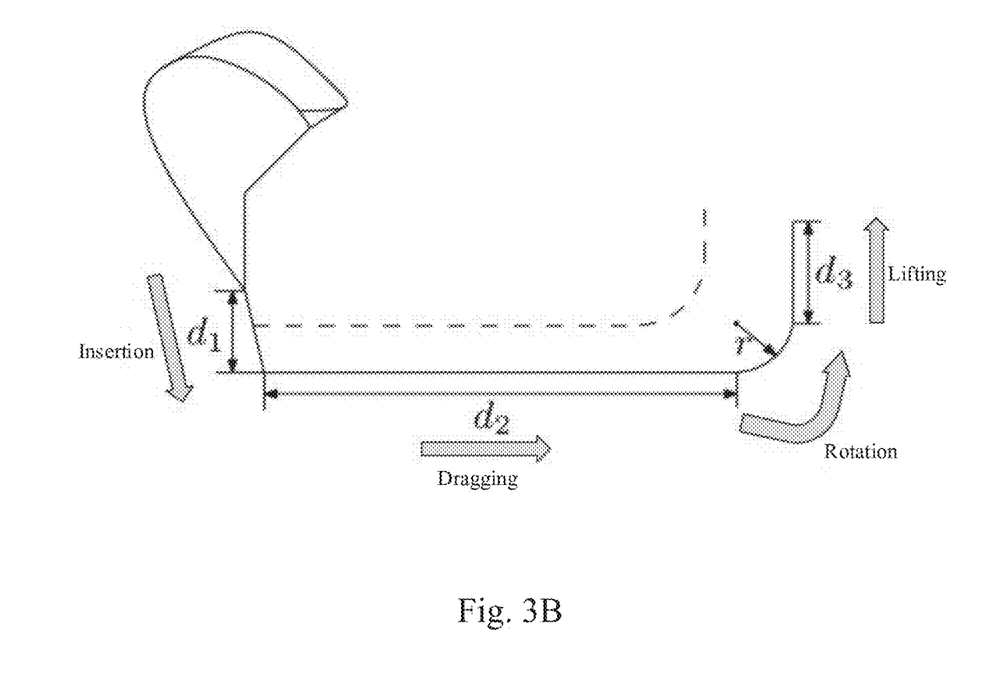
FIG. 3B is a schematic diagram of an excavating trajectory.

In practice, the excavating trajectory may be decomposed into four parts: insertion, dragging, rotation and lifting. Accordingly, the entire excavating trajectory may be characterized by four parameters, i.e., $d_1$ (insertion depth), $d_2$ (dragging length), r (rotation radius), and $d_3$ (lifting height). FIG. 3B shows a schematic diagram of an excavating trajectory. In FIG. 3B, the four parts and four parameters of the excavating trajectory are marked on the excavating trajectory.

Because the four parameters have respective ranges of values, the four parameters within the ranges of values are arbitrarily combined to obtain a plurality of excavating trajectories, that is, an excavating trajectory set.

Step 204: selecting a target excavating point based on the excavating trajectory set of the excavating point in the excavating point set.

In the present embodiment, for each excavating point in the excavating point set, the executing body may analyze the excavating trajectory set of the excavating point, and select the target excavating point based on the analysis result. Generally, not all excavation trajectories are feasible in the presence of an obstacle or due to the limitation of the mechanical structure of the autonomous excavator. Therefore, the excavating point with feasible excavating trajectories in the excavating trajectory set is a target excavating point; the excavating point without feasible excavating trajectories in the excavating trajectory set is not a target excavating point.

In the method for selecting a target excavating point according to some embodiments of the present disclosure, the acquired height map is first discretized to obtain an excavating point set; and then a target excavating point is selected based on an excavating trajectory set of an excavating point in the excavating point set. By selecting the target excavating point based on excavating trajectories, the rationality of the target excavating point is ensured, and the excavating efficiency is improved.

Figure 4:
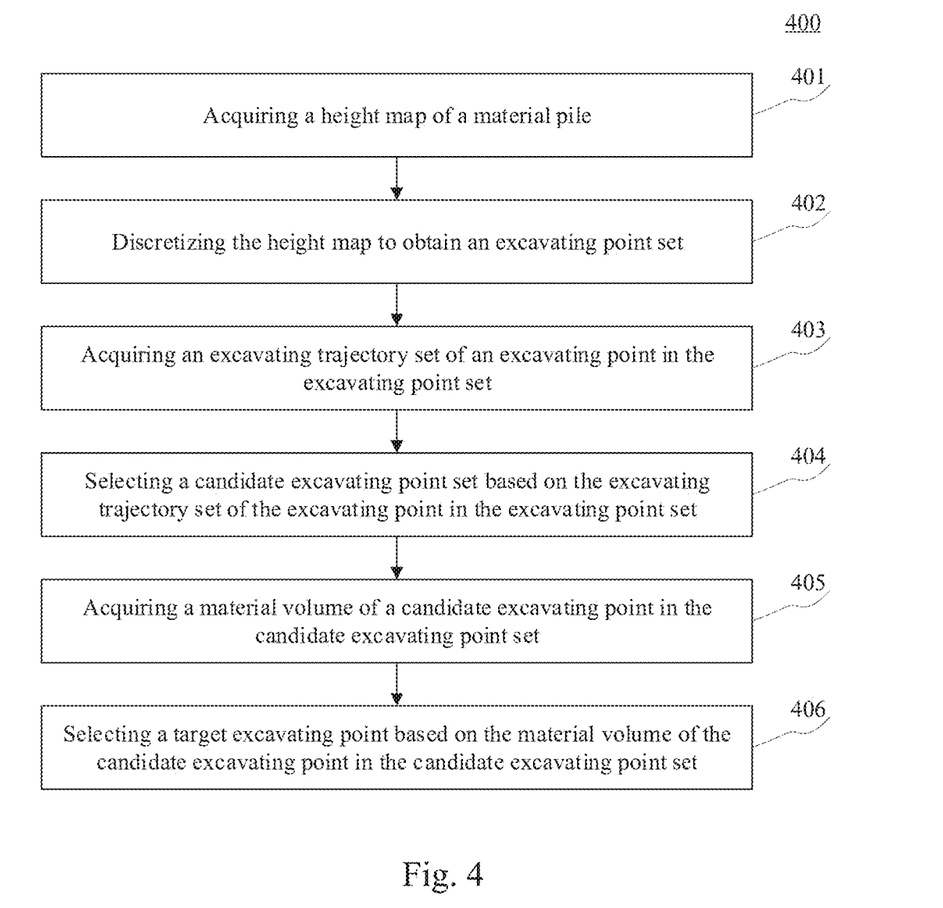
FIG. 4 is a flowchart of the method for selecting a target excavating point according to another embodiment of the present disclosure.

Further referring to FIG. 4, a flow 400 of the method for selecting a target excavating point according to another embodiment of the present disclosure is shown. The method for selecting a target excavating point includes the following steps.

Step 401: acquiring a height map of a material pile.

Step 402: discretizing the height map to obtain an excavating point set.

Step 403: acquiring an excavating trajectory set of an excavating point in the excavating point set.

In the present embodiment, the specific operations of steps 401-403 have been described in detail in steps 201-203 in the embodiment shown in FIG. 2, and details are not described herein again.

Step 404: selecting a candidate excavating point set based on the excavating trajectory set of the excavating point in the excavating point set.

In the present embodiment, an executing body (for example, the server 103 shown in FIG. 1) of the method for selecting a target excavating point may analyze the excavating trajectory set of the excavating point, and determine whether the excavating point is a candidate excavating point based on the analysis result. Generally, not all excavation trajectories are feasible in the presence of an obstacle or due to the limitation of a mechanical structure of an autonomous excavator. Therefore, the excavating point with feasible excavating trajectories in the excavating trajectory set is a candidate excavating point; the excavating point without feasible excavating trajectories in the excavating trajectory set is not a candidate excavating point.

In some optional implementations of the present embodiment, the executing body may determine whether the excavating trajectory set of the excavating point includes an excavating trajectory on which a bucket of the excavator does not collide with an obstacle during movement and the excavating resistance is not greater than the excavating power of the excavator; if including, the excavating point as a candidate excavating point is added to the candidate excavating point set, and the determined excavating trajectory as a candidate excavating trajectory is added to a candidate excavating trajectory set of the candidate excavating point. Generally, the excavating trajectory on which the bucket of the excavator does not collide with an obstacle during movement and the excavating resistance is not greater than the excavating power of the excavator is a feasible excavating trajectory. The excavating trajectory on which the bucket of the excavator collides with an obstacle during movement or the excavating resistance is greater than the excavating power of the excavator is not a feasible excavating trajectory. Then, the candidate excavating trajectories in the candidate excavating trajectory set of the candidate excavating points are all feasible excavating trajectories.

Step 405: acquiring a material volume of a candidate excavating point in the candidate excavating point set.

In the present embodiment, for each candidate excavating point in the candidate excavating point set, the executing body may analyze the materials at the candidate excavating point to obtain the material volume of the candidate excavating point.

In some optional implementations of the present embodiment, for a candidate excavating point in the candidate excavating point set, the executing body may calculate the material volume of the candidate excavating point based on parameters of a candidate excavating trajectory in the candidate excavating trajectory set of the candidate excavating point. The parameters of the excavating trajectory may include $d_1$ (insertion depth), $d_2$ (dragging length), r (rotation radius), and $d_3$ (lifting height). Because each candidate excavating trajectory has a group of parameters, a material volume can be calculated based on the parameters of each candidate excavating trajectory. That is, each candidate excavating track corresponds to a material volume.

In some optional implementations of the present embodiment, for each candidate excavating trajectory in the candidate excavating trajectory set of the candidate excavating point, the executing body may calculate a material volume corresponding to the candidate excavating trajectory based on the width of the bucket of the excavator, and the insertion depth and dragging length of the parameters of the candidate excavating trajectory, and determine a material volume of the candidate excavating point based on the material volume corresponding to the candidate excavating trajectory in the candidate excavating trajectory set of the candidate excavating point. For example, the executing body may use the product of the width of the bucket, and the insertion depth and dragging length of the parameters of the candidate excavating trajectory as the material volume corresponding to the candidate excavating trajectory. Then, the executing body may select the maximum material volume from the material volumes corresponding to the candidate excavating trajectories in the candidate excavating trajectory set as the material volume of the candidate excavating point.

Step 406: selecting a target excavating point based on the material volume of the candidate excavating point in the candidate excavating point set.

In the present embodiment, for each candidate excavating point in the candidate excavating point set, the executing body may analyze the material volume of the candidate excavating point to determine whether the candidate excavating point is a target excavating point. For example, the executing body may compare the material volume of the candidate excavating point with a preset volume threshold, and if the material volume is greater than the preset volume threshold, the candidate excavating point is used as the target excavating point. For another example, the executing body may select a candidate excavating point having the maximum material volume as the target excavating point from the candidate excavating point set.

It can be seen from FIG. 4 that, compared with the corresponding embodiment of FIG. 2, the flow 400 of the method for selecting a target excavating point in the present embodiment highlights the step of selecting a target excavating point. By combining the excavating trajectory and the material volume to select a target excavating point, not only can the materials at the target excavating point be excavated along a feasible excavating trajectory, but also the volume of the materials at the target excavating point is larger, which further improves the excavating efficiency.

Figure 5:
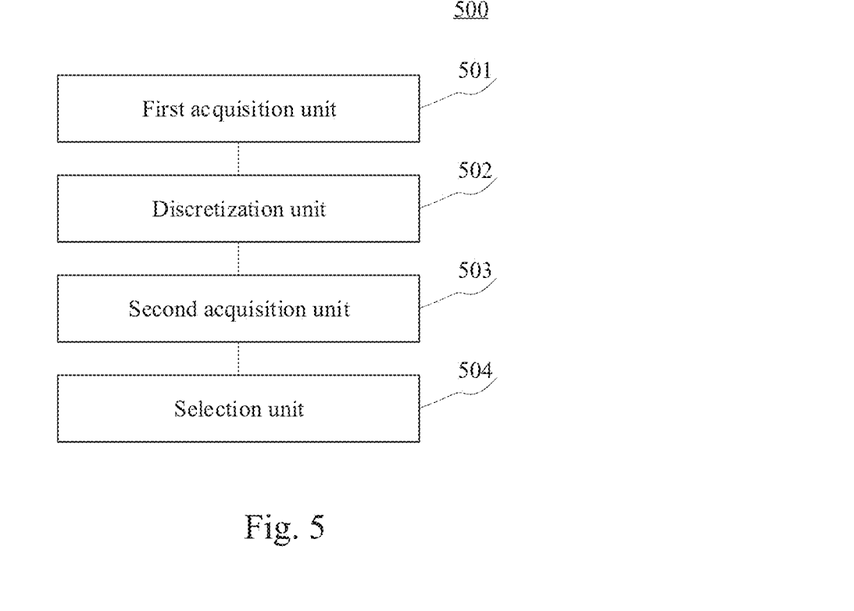
FIG. 5 is a schematic structural diagram of an apparatus for selecting a target excavating point according to an embodiment of the present disclosure.

Further referring to FIG. 5, as an implementation of the method shown in the above figures, an embodiment of the present disclosure provides an apparatus for selecting a target excavating point. An embodiment of the apparatus corresponds to the embodiment of the method shown in FIG. 2, and the apparatus may be applied to various electronic devices.

As shown in FIG. 5, the apparatus 500 for selecting a target excavating point in the present embodiment may include: a first acquisition unit 501, a discretization unit 502, a second acquisition unit 503, and a selection unit 504. The first acquisition unit 501 is configured to acquire a height map of a material pile; the discretization unit 502 is configured to discretize the height map to obtain an excavating point set; the second acquisition unit 503 is configured to acquire an excavating trajectory set of an excavating point in the excavating point set; and the selection unit is configured to select a target excavating point based on the excavating trajectory set of the excavating point in the excavating point set.

In the present embodiment, specific processes of the first acquisition unit 501, the discretization unit 502, the second acquisition unit 503, and the selection unit 504 in the apparatus 500 for selecting a target excavating point and technical effects brought can be referenced in related descriptions of step 201, step 202, step 203 and step 204 in the corresponding embodiment of FIG. 2 respectively, and details are not described herein again.

In some optional implementations of the present embodiment, the selection unit 504 includes: a first selection subunit (not shown), configured to select a candidate excavating point set based on the excavating trajectory set of the excavating point in the excavating point set; an acquisition subunit (not shown), configured to acquire a material volume of a candidate excavating point in the candidate excavating point set; and a second selection subunit (not shown), configured to select a target excavating point based on the material volume of the candidate excavating point in the candidate excavating point set.

In some optional implementations of the present embodiment, the first selection subunit includes: a determination module (not shown), configured to determine, for an excavating point in the excavating point set, whether the excavating trajectory set of the excavating point includes an excavating trajectory on which a bucket of an excavator does not collide with an obstacle during movement and an excavating resistance is not greater than an excavating power of the excavator; and an adding module (not shown), configured to add, in response to determining that the excavating trajectory set of the excavating point comprises the excavating trajectory on which the bucket of the excavator does not collide with the obstacle during movement and the excavating resistance is not greater than the excavating power of the excavator, the excavating point as a candidate excavating point to the candidate excavating point set, and add the determined excavating trajectory as a candidate excavating trajectory to a candidate excavating trajectory set of the candidate excavating point.

In some optional implementations of the present embodiment, the acquisition subunit includes: a calculation module (not shown), configured to calculate, for a candidate excavating point in the candidate excavating point set, a material volume of the candidate excavating point based on parameters of a candidate excavating trajectory in the candidate excavating trajectory set of the candidate excavating point, where the parameters of the candidate excavating trajectory include an insertion depth, a dragging length, a rotation radius, and a lifting height.

In some optional implementations of the present embodiment, the calculation module includes: a calculation submodule (not shown), configured to calculate, for a candidate excavating trajectory in the candidate excavating trajectory set of the candidate excavating point, a material volume corresponding to the candidate excavating trajectory based on a width of the bucket of the excavator, and the insertion depth and dragging length of the parameters of the candidate excavating trajectory; and a determination submodule (not shown), configured to determine a material volume of the candidate excavating point based on the material volume corresponding to the candidate excavating trajectory in the candidate excavating trajectory set of the candidate excavating point.

In some optional implementations of the present embodiment, the discretizing the height map is implemented by contour line discretization.

Figure 6:
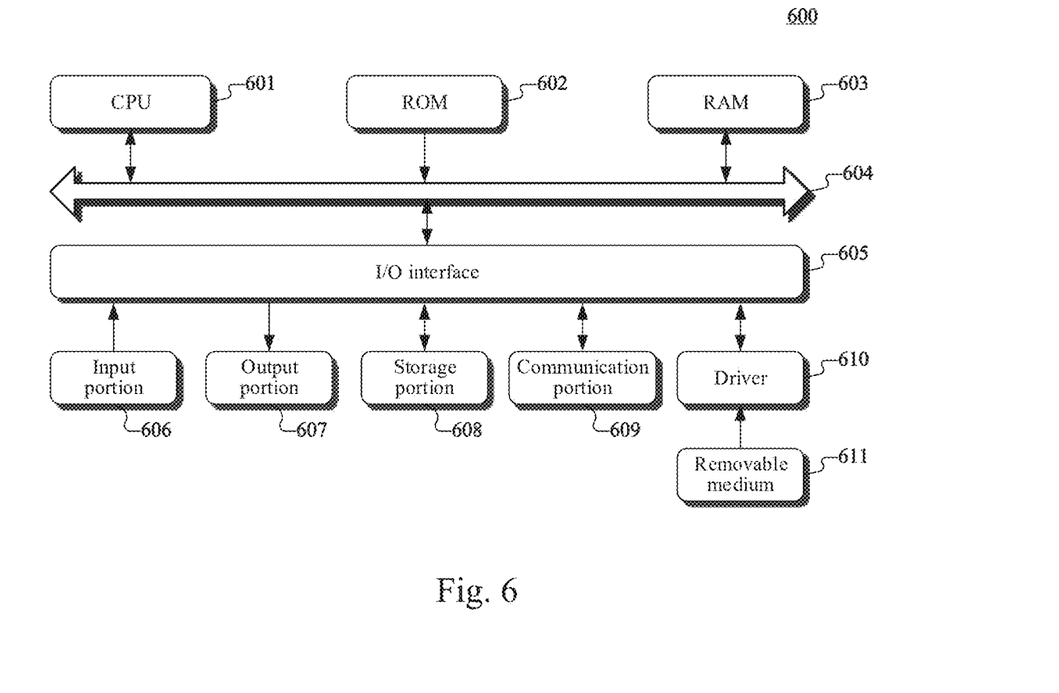
FIG. 6 is a schematic structural diagram of a computer system adapted to implement an electronic device of embodiments of the present disclosure.

Further referring to FIG. 6, a schematic structural diagram of a computer system 600 adapted to implement an electronic device (for example, the server 103 shown in FIG. 1) of some embodiments of the present disclosure is shown. The electronic device shown in FIG. 6 is just an example, which does not impose any restrictions on the functions and scope of application of embodiments of the present disclosure.

As shown in FIG. 6, the computer system 600 includes a central processing unit (CPU) 601, which can execute various appropriate operations and processes based on programs stored in a read-only memory (ROM) 602 or programs loaded from a storage portion 608 to a random access memory (RAM) 603. Various programs and data required by the operations of the system 600 are also stored in the RAM 603. The CPU 601, the ROM 602, and the RAM 603 are connected to each other by a bus 604. An input/output (I/O) interface 605 is also connected to the bus 604.

The following parts are connected to the I/O interface 605: an input portion 606 including a keyboard, a mouse, etc.; an output portion 607 including a cathode ray tube (CRT), a liquid crystal display (LCD), a loudspeaker, etc.; a storage portion 608 including a hard disk, etc.; and a communication portion 609 including a network interface card such as an LAN card and a modem. The communication portion 609 executes communication processing through a network such as Internet. A driver 610 is also connected to the I/O interface 1005 as needed. A removable medium 611 such as a magnetic disk, an optical disk, a magneto-optical disk or a semiconductor memory is installed on the driver 610 as needed, so that a computer program read therefrom is installed in the storage portion 608 as needed.

Particularly, according to some embodiments of the present disclosure, the process described above by referring to the flowchart can be implemented as a computer software program. For example, an embodiment of the present disclosure provides a computer program product including a computer program loaded to a computer readable medium, the computer program including a program code for executing the method shown in the flowchart. In such an embodiment, the computer program may be downloaded and installed from a network by the communication portion 609, and/or installed from the removable medium 611. When the computer program is executed by the CPU 601, the functions defined in the method of some embodiments of the present disclosure are executed. It should be noted that the computer readable medium of some embodiments of the present disclosure may be a computer readable signal medium or a computer readable medium or a combination of the two. An example of the computer readable medium may be, but is not limited to: electric, magnetic, optical, electromagnetic, infrared, or semiconductor systems, apparatuses, elements, or any combination of the above. A more specific example of the computer readable medium may include but is not limited to: an electrical connection with one or more wires, a portable computer disk, a hard disk, a random access memory (RAM), a read-only memory (ROM), an erasable programmable read-only memory (EPROM or flash memory), a fiber, a portable compact disk read-only memory (CD-ROM), an optical memory, a magnet memory, or any suitable combination of the above. In some embodiments of the present disclosure, the computer readable medium may be any tangible medium containing or storing a program which may be used by an instruction execution system, apparatus or device or a combination of them. In some embodiments of the present disclosure, the computer readable signal medium may include data signals in the base band or propagated as part of carriers, in which computer readable program codes are carried. The data signals propagated may be in multiple forms, including but not limited to electromagnetic signals, optical signals or any appropriate combination of them. The computer readable signal medium may also be any computer readable medium except the computer readable medium. The computer readable medium is capable of sending, propagating or transmitting a program used by an instruction execution system, apparatus or device or a combination of them. The program codes included in the computer readable medium may be transmitted by any appropriate medium, including but not limited to wireless, wired, optical cable, RF, etc., or any appropriate combination of them.

Computer program codes for executing the operations in some embodiments of the present disclosure may be compiled using one or more programming languages or combinations thereof. The programming languages include object-oriented programming languages, such as Java, Smalltalk, and C++, and also include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or a server. In the circumstance involving a remote computer, the remote computer may be connected to a user's computer through any network, including a local area network (LAN) or a wide area network (WAN), or connected to an external computer (for example, connected through Internet using an Internet service provider).

The process diagrams and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in some embodiments of the present disclosure may be implemented by software or hardware. The units described may also be set in a processor, for example, the processor includes a first acquisition unit, a discretization unit, a second acquisition unit, and a selection unit. The names of these units do not constitute limitations to such units themselves in some cases. For example, the first acquisition unit may also be described as "a unit for acquiring a height map of a material pile."

As another aspect, an embodiment of the present disclosure further provides a computer readable medium, which may be included in the electronic device described in the above embodiment, and may also exist alone and not be assembled into the electronic device. The computer readable medium carries one or more programs, and when the one or more programs are executed by the electronic device, the electronic device is caused to: acquire a height map of a material pile; discretize the height map to obtain an excavating point set; acquire an excavating trajectory set of an excavating point in the excavating point set; and select a target excavating point based on the excavating trajectory set of the excavating point in the excavating point set.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with, but not limited to, technical features with similar functions disclosed in the present disclosure are examples.

What is claimed is:

1. A method for selecting a target excavating point, comprising:
    acquiring a height map of a material pile;
    discretizing the height map to obtain an excavating point set;
    acquiring an excavating trajectory set of an excavating point in the excavating point set; and
    selecting a target excavating point based on the excavating trajectory set of the excavating point in the excavating point set.

2. The method according to claim 1, wherein the selecting a target excavating point based on the excavating trajectory set of the excavating point in the excavating point set comprises:
    selecting a candidate excavating point set based on the excavating trajectory set of the excavating point in the excavating point set;
    acquiring a material volume of a candidate excavating point in the candidate excavating point set; and
    selecting a target excavating point based on the material volume of the candidate excavating point in the candidate excavating point set.

3. The method according to claim 2, wherein the selecting a candidate excavating point set based on the excavating trajectory set of the excavating point in the excavating point set comprises:
    for an excavating point in the excavating point set, determining whether the excavating trajectory set of the excavating point comprises an excavating trajectory on which a bucket of an excavator does not collide with an obstacle during movement and an excavating resistance is not greater than an excavating power of the excavator; and
    in response to determining that the excavating trajectory set of the excavating point comprises the excavating trajectory on which the bucket of the excavator does not collide with the obstacle during movement and the excavating resistance is not greater than the excavating power of the excavator, adding the excavating point as a candidate excavating point to the candidate excavating point set, and adding the determined excavating trajectory as a candidate excavating trajectory to a candidate excavating trajectory set of the candidate excavating point.

4. The method according to claim 3, wherein the acquiring a material volume of a candidate excavating point in the candidate excavating point set comprises:
    for a candidate excavating point in the candidate excavating point set, calculating a material volume of the candidate excavating point based on parameters of a candidate excavating trajectory in the candidate excavating trajectory set of the candidate excavating point, wherein the parameters of the candidate excavating trajectory comprise an insertion depth, a dragging length, a rotation radius, and a lifting height.

5. The method according to claim 4, wherein the calculating a material volume of the candidate excavating point based on parameters of a candidate excavating trajectory in the candidate excavating trajectory set of the candidate excavating point comprises:
    for a candidate excavating trajectory in the candidate excavating trajectory set of the candidate excavating point, calculating a material volume corresponding to the candidate excavating trajectory based on a width of the bucket of the excavator, and the insertion depth and dragging length of the parameters of the candidate excavating trajectory; and determining a material volume of the candidate excavating point based on the material volume corresponding to the candidate excavating trajectory in the candidate excavating trajectory set of the candidate excavating point.

6. The method according to claim 1, wherein the discretizing the height map is implemented by contour line discretization.

7. An apparatus for selecting a target excavating point, comprising:

at least one processor; and a memory storing instructions, the instructions when executed by the at least one processor, cause the at least one processor to perform operations, the operations comprising:

acquiring a height map of a material pile;

discretizing the height map to obtain an excavating point set;

acquiring an excavating trajectory set of an excavating point in the excavating point set; and selecting a target excavating point based on the excavating trajectory set of the excavating point in the excavating point set.

8. The apparatus according to claim 7, wherein the selecting a target excavating point based on the excavating trajectory set of the excavating point in the excavating point set comprises:

selecting a candidate excavating point set based on the excavating trajectory set of the excavating point in the excavating point set;

acquiring a material volume of a candidate excavating point in the candidate excavating point set; and selecting a target excavating point based on the material volume of the candidate excavating point in the candidate excavating point set.

9. The apparatus according to claim 8, wherein the selecting a candidate excavating point set based on the excavating trajectory set of the excavating point in the excavating point set comprises:

determining, for an excavating point in the excavating point set, whether the excavating trajectory set of the excavating point comprises an excavating trajectory on which a bucket of an excavator does not collide with an obstacle during movement and an excavating resistance is not greater than an excavating power of the excavator; and adding, in response to determining that the excavating trajectory set of the excavating point comprises the excavating trajectory on which the bucket of the excavator does not collide with the obstacle during movement and the excavating resistance is not greater than the excavating power of the excavator, the excavating point as a candidate excavating point to the candidate excavating point set, and add the determined excavating trajectory as a candidate excavating trajectory to a candidate excavating trajectory set of the candidate excavating point.

10. The apparatus according to claim 9, wherein the acquiring a material volume of a candidate excavating point in the candidate excavating point set comprises:

calculating, for a candidate excavating point in the candidate excavating point set, a material volume of the candidate excavating point based on parameters of a candidate excavating trajectory in the candidate excavating trajectory set of the candidate excavating point, wherein the parameters of the candidate excavating trajectory comprise an insertion depth, a dragging length, a rotation radius, and a lifting height.

11. The apparatus according to claim 10, wherein the calculating a material volume of the candidate excavating point based on parameters of a candidate excavating trajectory in the candidate excavating trajectory set of the candidate excavating point comprises:

calculating, for a candidate excavating trajectory in the candidate excavating trajectory set of the candidate excavating point, a material volume corresponding to the candidate excavating trajectory based on a width of the bucket of the excavator, and the insertion depth and dragging length of the parameters of the candidate excavating trajectory; and determining a material volume of the candidate excavating point based on the material volume corresponding to the candidate excavating trajectory in the candidate excavating trajectory set of the candidate excavating point.

12. The apparatus according to claim 7, wherein the discretizing the height map is implemented by contour line discretization.

13. A non-transitory computer readable medium storing a computer program, wherein the computer program, when executed by a processor, causes the processor to perform operations, the operations comprising:

acquiring a height map of a material pile;

discretizing the height map to obtain an excavating point set;

acquiring an excavating trajectory set of an excavating point in the excavating point set; and selecting a target excavating point based on the excavating trajectory set of the excavating point in the excavating point set.

* * * * *